United States Patent

Hansen

[11] 3,931,746
[45] Jan. 13, 1976

[54] CABLE ACTUATED CLUTCH CONTROL

[75] Inventor: Kenneth N. Hansen, Waukesha, Wis.

[73] Assignee: Allis-Chalmers Corporation, Milwaukee, Wis.

[22] Filed: Dec. 17, 1973

[21] Appl. No.: 425,315

[52] U.S. Cl. .................. 74/501 R; 180/89 R
[51] Int. Cl.² ............................ F16C 1/10
[58] Field of Search .......... 74/501 R; 180/77 R, 35, 180/89 R; 280/106.5 R; 251/294, 295, 78, 80; 403/229, 166

[56] References Cited
UNITED STATES PATENTS

| | | | |
|---|---|---|---|
| 3,700,080 | 10/1972 | Delorean | 251/294 X |
| 3,732,941 | 5/1973 | Davis et al. | 180/89 R |

*Primary Examiner*—Samuel Scott
*Assistant Examiner*—Frank H. McKenzie, Jr.
*Attorney, Agent, or Firm*—Arthur L. Nelson

[57] ABSTRACT

A cable actuated control on a vehicle with a resilient overload link in the cable actuator. The cable actuated control is used on a tractor having a resiliently mounted operator station carrying a control lever which operates through the cable to control a device rigidly mounted on the chassis.

10 Claims, 3 Drawing Figures

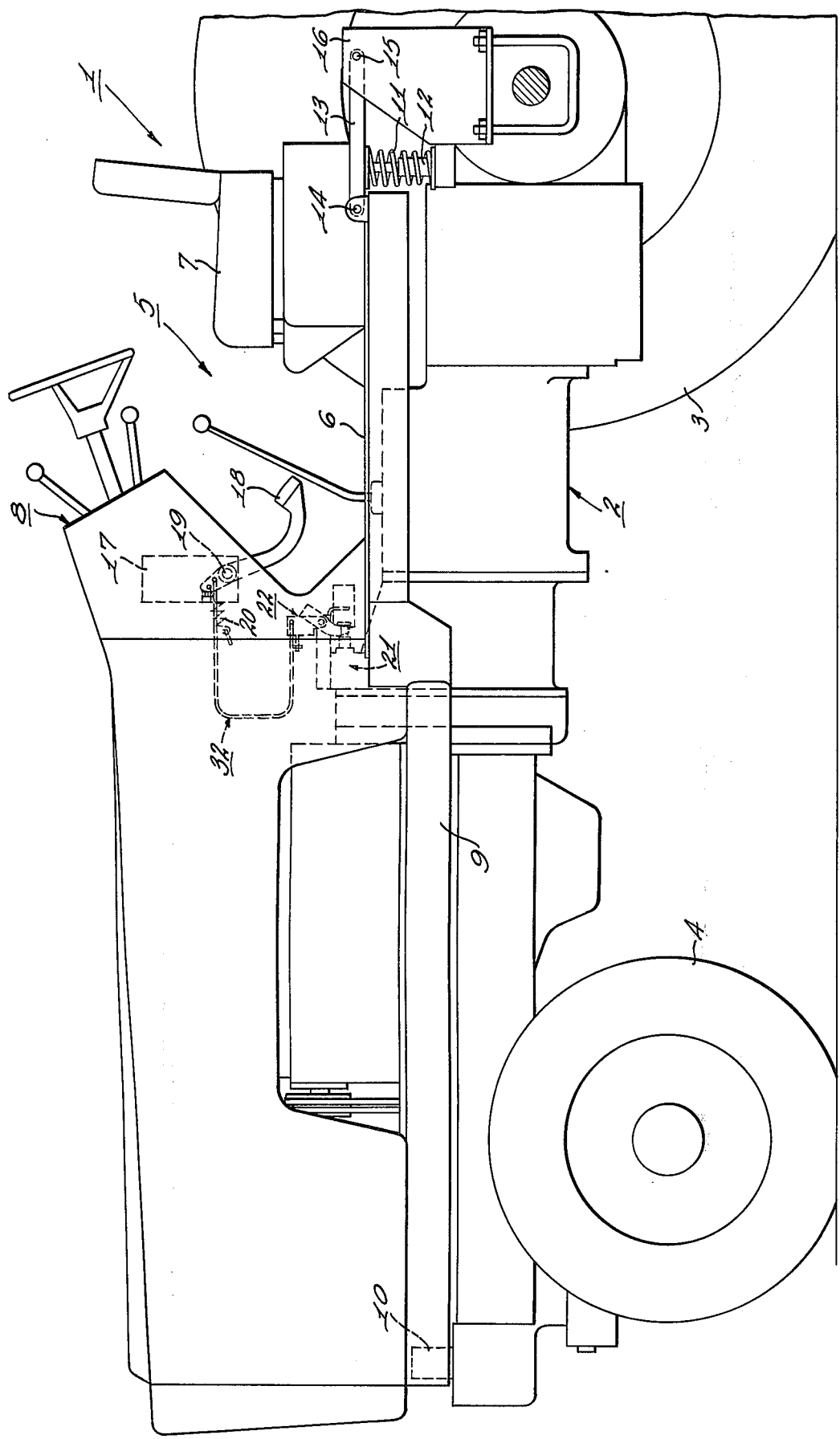

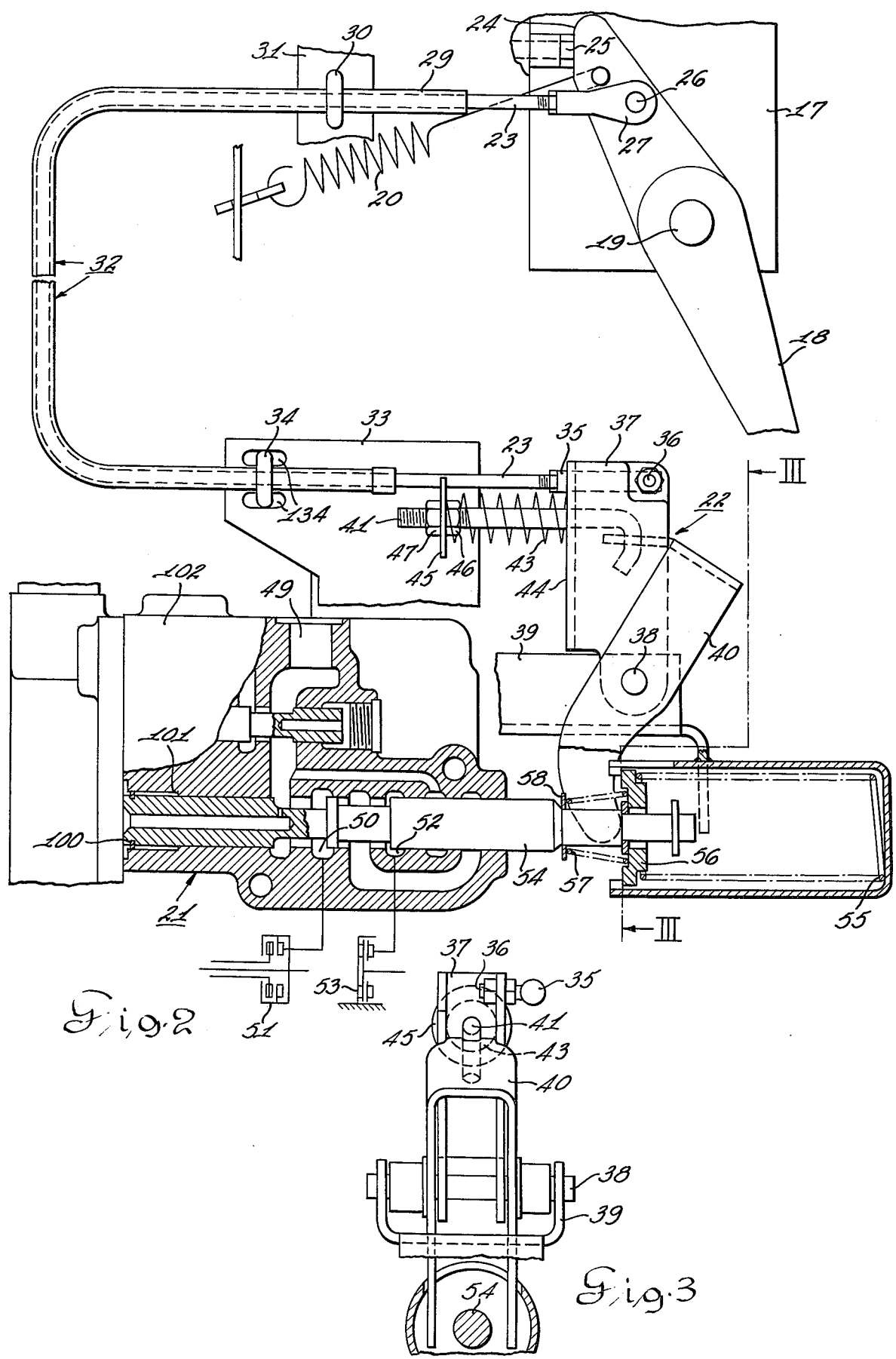

CABLE ACTUATED CLUTCH CONTROL

This invention relates to a control mechanism on a vehicle and more particularly to a resilient overload link in a cable operator for operating between a control lever and a hydraulic valve for a hydraulic actuator.

Conventional draft vehicles such as farm tractors are ordinarily supported on a chassis which is unsprung on the wheels of the vehicle. The operator platform is mounted on the chassis in a manner to rigidly support the operator station on the chassis. This type of a vehicle does not provide any resilience for softness of ride for the operator of the vehicle. More recently tractors have included a resiliently mounted operator station supported on the vehicle through resilient rubber isolators. An illustration of a resilient supporting of the operator station on the chassis is shown in the Davis et al U.S. pat. No. 3,732,941, Vehicle Chassis Resiliently Supported on the Main Frame. This type of a support for the operator station on the chassis, however, does present a problem in connecting a control lever at the operator station to the servomechanism on the vehicle chassis. The relative movement between the operator station and the chassis may tend to operate the servomechanism even though the control lever is not moved, if a solid link is used as a connecting member between the control lever and the servomechanism. The reverse situation may happen since the relative movement between the operator station and the chassis may tend to prevent operation of the servomechanism although movement of the control lever is made by the operator. This may produce a poor response to the vehicle controls. Accordingly, to overcome this problem a flexible transmitting link must be used between the control lever and the servomechanism. A sheathed cable is used to transmit the operating force from the control lever to the servomechanism. In order to reduce the size of the sheathed cable an overload link can be placed in the cable to absorb peak loads which may be transmitted from the control lever to the servomechanism. Such an overload link will absorb shock loading and prevent failure of the cable if the force transmitted through the cable becomes excessive.

It is an object of this invention to provide a resilient overload link in the cable operator for a vehicle control mechanism.

It is another object of this invention to provide a cable-operated control mechanism having a resilient overload link to absorb excessive loads.

It is a further object of this invention to provide an actuating mechanism for use on a vehicle having a resiliently mounted operator station carrying a lever operating through a cable and an overload link to operate a control device on the vehicle chassis.

The objects of this invention are accomplished by providing a draft vehicle with a chassis mounted unsprung on the vehicle wheels. The operator station including the platform, the control console and the operator seat are mounted resiliently on the chassis in a manner whereby substantial relative movement between the chassis and the operator station is permitted. Accordingly, a flexible connecting linkage is required between the control lever on the control console and a servomechanism of the chassis. To prevent overloading of the flexible connecting linkage a resilient overload link is positioned in the flexible linkage as a safety precaution and also to permit use of a smaller force transmitting mechanism than would ordinarily be used.

Referring to the drawings a preferred embodiment of this invention is illustrated.

FIG. 1 illustrates the cable actuating mechanism on a vehicle.

FIG. 2 illustrates an enlarged view of the cable actuating mechanism operating a hydraulic valve.

FIG. 3 is a cross section view taken on line III-III of FIG. 2.

Referring to the drawings, FIG. 1 illustrates a tractor 1 having a chassis 2 mounted unsprung on the wheels 3 and 4. The chassis 2 resiliently supports the operator station 5 which consists essentially of a platform 6 supporting the seat 7 and a control console 8. The operator station is integral with the frame 9 which extends forwardly and is supported on resilient elements 10. The operator station also extends rearwardly where it is supported on a plurality of springs 11 and shock absorbers 12. A plurality of pivoting links 13 are pivotally connected between the joint 14 on the platform 6 and the connection 15 on the bracket 16 of the chassis 2. Accordingly, the operator station is permitted to move substantially relative to the chassis 2. The control console 8 carries a bracket 17 which pivotally supports a pedal 18 on the pin 19. The pedal 18 is normally retracted to its return position by the spring 20. A hydraulic valve 21 is mounted on the chassis 2 and operated through the overload linkage 22 in response to an actuating force transmitted through the cable 23.

FIGS. 2 and 3 are enlarged views of the force transmitting mechanism. The bracket 17 carries the pin 19 which pivotally supports the lever 18. The upper end of the lever 18 forms a rest surface 24 which forms a stop for the lever as it rests on the abutment 25 carried on the bracket 17. The return spring 20 normally returns the lever to its retracted position as shown in FIG. 2.

The lever 18 carries a connecting pin 26 which is connected to clevis 27 of the cable 23. The cable 23 extends into the sheath 29. The sheath 29 is locked by the U-bolt 30 into the cable support 31 carried in the control console 8.

The sheathed cable 32 extends from the control console 8 to the cable mounting 33 on the chassis 2. The cable mount 33 also carries a U-bolt 34 which fastens the sheath to the chassis. The U-bolt 34 is mounted in slots 134 and permits slidably adjusting the sheathed cable 32 to adjust the overload linkage 22 with reference to the spool 54. The cable 23 is connected on its lower end by the clevis 35 to the cross bolt 36 of the link 37. The link 37 is pivotally supported by the pin 38 on the bracket 39. The arm 40 is also pivotally mounted on the pin 38. The bolt 41 is connected to the arm 40 which in turn is carried on the link 37. The bolt 41 is biased in the left-hand direction by the compression spring 43 which is compressively positioned between the flange 44 of link 37 and a washer 45 positioned on the bolt 41 between the nuts 46 and 47. The arm 40, in the position shown, operates the hydraulic control valve 21 which is mounted on the vehicle chassis 2. The hydraulic control valve 21 defines an inlet passage 49 adapted for connection to a pump. The annular chamber 50 is adapted for connection to the clutch 51 while the chamber 52 is adapted for connection to the brake 53.

The spool 54 is normally biased in the left-hand direction by the spring 55 operating against the plate 56.

The spring 55 overcomes the force of the spring 57 which is positioned between the washer 58 and the plate 56.

The clutch pedal 18 is normally returned to the position shown in FIG. 2 while the spool 54 is normally returned to the position as shown in FIG. 2 when the device is in its normally retracted position.

The operation of this device will be described in the following paragraphs.

The pedal 18 is normally retracted to the position shown in FIG. 2 by the retraction spring 20. The cable 23 is positioned as shown which allows the spring 55 to position the linkage 22 for operating the hydraulic valve 21 from the position as shown. The spring 55 in the valve 21 biases the spool 54 in the left-hand position as shown against spring 57.

As the pedal 18 is depressed, the cable portion connected to the clevis 27 moves in the right-hand direction to extend from the cable sheath 29. This, in turn, draws the clevis in the right-hand direction and the cable 23 from the sheath 29. The link 37 and arm 40 pivot on the pin 38. The compressive force on the spring 43 from link 37 causes the arm 40 to pivot in the counterclockwise direction forcing the plate 56 on spool 54 in a right-hand direction. Accordingly, the force actuating the spool 54 is transmitted through the spring 43. If the operator suddenly operates the pedal 18 the impact load transmitted through the cable 23 is cushioned by the cushioning force of the spring 43 and the spool moves in a right-hand direction, but the loading on the cable is kept below a certain peak value. Continued movement in this direction will disengage the clutch 51 and engage the brake 53. The continued movement will cause the snapring 100 to engage the flange 101 in the valve housing 102. If the arresting of movement of the valve spool is sudden at the end of its stroke, it will not place an excessive load on the cable 23, since the overload mechanism 22 will allow compression of the spring 43 and the impact load normally inherent with this type of movement will be substantially reduced.

The pivoting movement of the right arm 40 compresses spring 55 and moves the spool 54 in the right-hand direction to disengage the clutch and actuate the brake.

When pedal 18 is released, spring 55 will bias spool 54 in a left-hand direction causing a clockwise pivoting movement of the arm 40 and link 37. This, in turn, will cause the cable 23 to extend from the sheath 29 and the valve spool 54 will close the brake valve and open the clutch valve and engage the hydraulic clutch 51. The pedal 18 returns to its normally retracted position as shown in FIG. 2.

It can be seen that the cable operator mechanism provides a means for operating a valve on the chassis through a flexible cable 32. This device is well adapted to use with cabs mounted on the vehicles where the oscillation or chatter which is caused by the movement of the cab relative to the chassis is compensated for by a flexible cable as shown. It also overcomes the danger of failure during a panic stop when the operator suddenly depresses the clutch pedal 18 with excessive force. The force is not transmitted to the spool since the overload arrangement will provide a cushioning of the force to reduce the impact on the overload mechanism and prevent the valve from failing. It also avoids subjecting the cable 23 to excessive force, because the force is dampened in spring 43.

The spring 43 in this device, which is a heavy spring, can be easily assembled. Not only can this linkage be assembled, but there is provision for adjusting the tension of spring 43 by adjusting the nuts 46 and 47 on the bolt 41. This is necessary since a certain tension is required on the linkage for actuating the spool valve 54. Normally the spool valve 54 is operated against the force of spring 55 and the valve should normally be in its position, shown retracted, so that the hydraulic clutch is engaged. The spring 43, also should have an adequate compression force to overcome the force of spring 55 when the clutch pedal is retracted.

The embodiments of the invention in which an enclusive property or privilege is claimed are defined as follows:

1. A cable actuated control mechanism on a vehicle including, a vehicle chassis, an operator control station including a platform and control console resiliently mounted on said chassis permitting relative movement between said operator station and said chassis, a control lever mounted on said control console, a servomechanism mounted on said vehicle chassis, a resilient overload linkage connected to said servomechanism, a flexible control mechanism to accommodate relative movement between said operator station and said chassis, including a sheathed cable comprising a sheath and means connecting one end of said sheath to said control console and means connecting the other end of said sheath to said chassis, a cable connected between said control lever and said resilient overload linkage to operate said servomechanism, said resilient overload linkage including resilient force transmitting means for limiting the peak load transmitted from said cable to said servomechanism when said control lever is actuated.

2. A cable actuated control mechanism on a vehicle as set forth in claim 1 wherein said flexible control mechanism includes said sheathed cable including means connecting the sheath of said cable to said control console, means connecting the opposite end of the sheath to said chassis.

3. The cable actuated control mechanism on a vehicle as set forth in claim 1 wherein said resilient force transmitting means includes a spring for transmitting the force for actuating said servomechanism.

4. A cable actuated control mechanism on a vehicle as set forth in claim 1, wherein said lever includes a clutch pedal.

5. A cable actuated control mechanism on a vehicle as set forth in claim 1 wherein said servomechanism includes a hydraulic control valve.

6. A cable actuated control mechanism on a vehicle as set forth in claim 1 wherein said resilient overload linkage includes a pair of levers pivotally mounted on said chassis, a spring compressively positioned between said levers defining said resilient force transmitting means for transmitting the force from said cable to said servomechanism.

7. A cable actuated control mechanism as set forth in claim 1, wherein said sheathed cable includes a cable, a sheath on said cable, means connecting one end of said sheath to said control console, means adjustably connecting the other end of said sheath to said chassis for adjustably positioning said resilient overload linkage relative to said cable.

8. A cable actuated control mechanism on a vehicle as set forth in claim 1 wherein said resilient force transmitting means includes a spring, a cable in said sheathed cable connected between said lever and said resilient force transmitting means for transmitting the force transmitted through said spring, said spring thereby limiting the peak load on said servomechanism.

9. A cable actuated control mechanism as set forth in claim 1, wherein said flexible control mechanism includes a sheath and a cable, means connecting the sheath of said cable to said control console, means connecting the opposite end of said sheath to said chassis, said lever thereby sliding said cable through said sheath to operate said servomechanism through said resilient overload linkage.

10. A cable actuated control mechanism on a vehicle as set forth in claim 1, wherein said servomechanism defines a stop to limit cable movement, said flexible resilient force transmitting means includes a spring whereby said spring is compressed when said servomechanism reaches the stop position to thereby prevent overloading of said cable.

\* \* \* \* \*